United States Patent [19]

Lewis

[11] Patent Number: 4,637,596
[45] Date of Patent: Jan. 20, 1987

[54] STRUCTURAL CORE PIVOT

[75] Inventor: Richard J. Lewis, New Hartford, N.Y.

[73] Assignee: Allied Corporation, Morris Township, Morris County, N.J.

[21] Appl. No.: 784,148

[22] Filed: Oct. 4, 1985

[51] Int. Cl.$^4$ .............................................. F16F 3/02
[52] U.S. Cl. ................................................... 267/160
[58] Field of Search .............. 248/603, 604, 614, 626; 267/158, 160, 165

[56] References Cited

U.S. PATENT DOCUMENTS

| | | |
|---|---|---|
| 3,073,584 | 1/1963 | Troeger . |
| 3,181,851 | 5/1965 | Troeger . |
| 3,181,918 | 5/1965 | Troeger . |
| 3,188,071 | 6/1965 | Owen .................................. 267/160 |
| 3,252,696 | 5/1966 | Friedel . |
| 3,319,951 | 6/1967 | Seelig . |
| 3,807,029 | 4/1974 | Troeger . |
| 3,811,665 | 5/1974 | Seelig . |
| 3,825,992 | 7/1974 | Troeger . |
| 3,844,022 | 10/1974 | Kutash . |
| 4,327,527 | 5/1982 | Seelig . |

Primary Examiner—Duane A. Reger
Attorney, Agent, or Firm—Howard G. Massung

[57] ABSTRACT

A flexural pivot formed from two members (12, 16) each of which have a large diameter portion (13, 17) extending more than 180° circumferentially around the pivot and a small diameter portion (14, 18) disposed between the circumferentially spaced ends of the large diameter portion (13, 17). Flat springs (21, 22) interconnect the two members (12, 16). The flexural pivot can be of the cantilever type (10) wherein both members (12, 16) have relatively the same shape or of the double ended type (60) wherein the two members (62, 66) have different shapes. In either embodiment, the smaller outer diameter portions of one member fit in the circumferentially defined space between the larger outer diameter portions of the other member. The disclosed construction eliminates the need for a separate supporting sleeve for the flexural pivot (110, 60).

12 Claims, 12 Drawing Figures

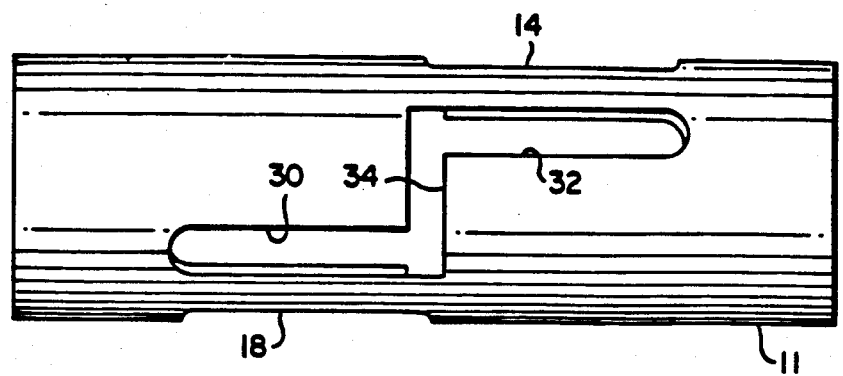
FIG. 1
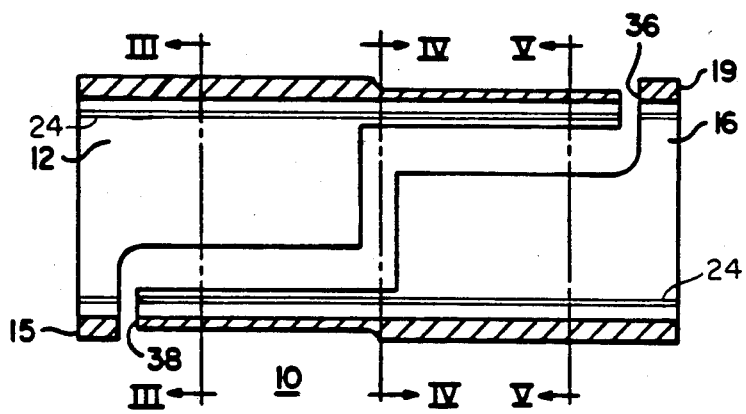
FIG. 2
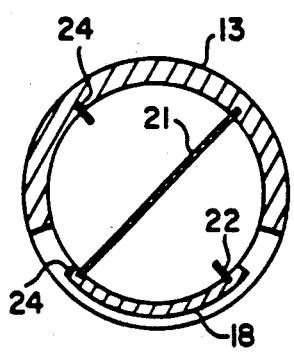 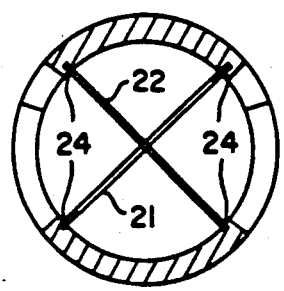 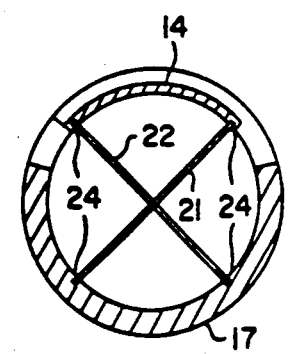
FIG. 3    FIG. 4    FIG. 5

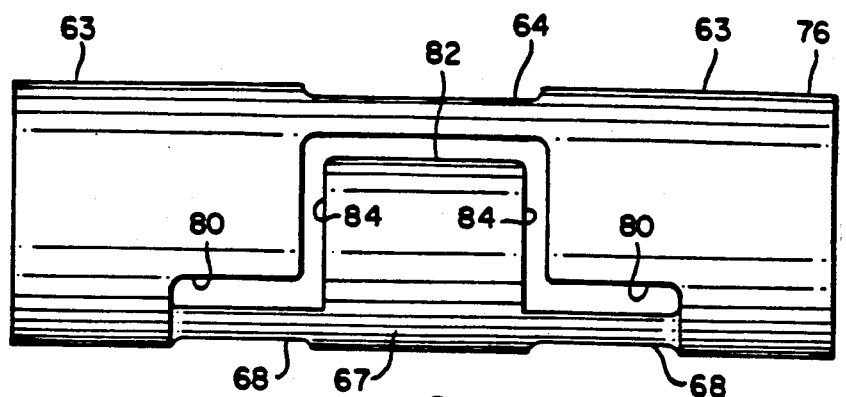
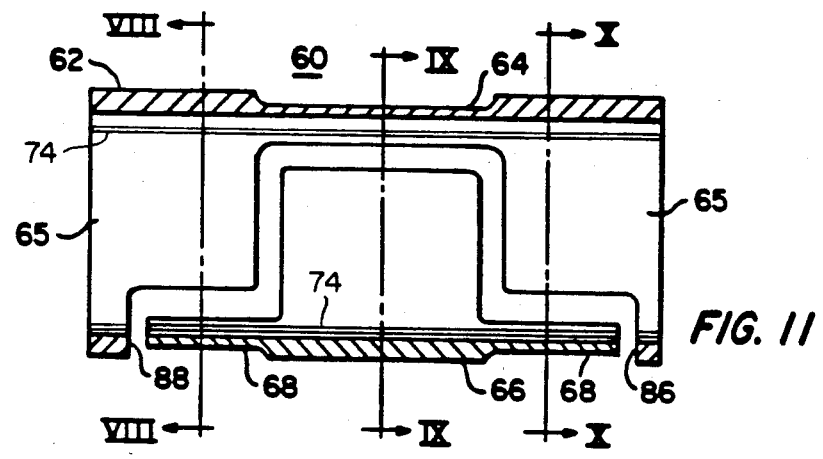
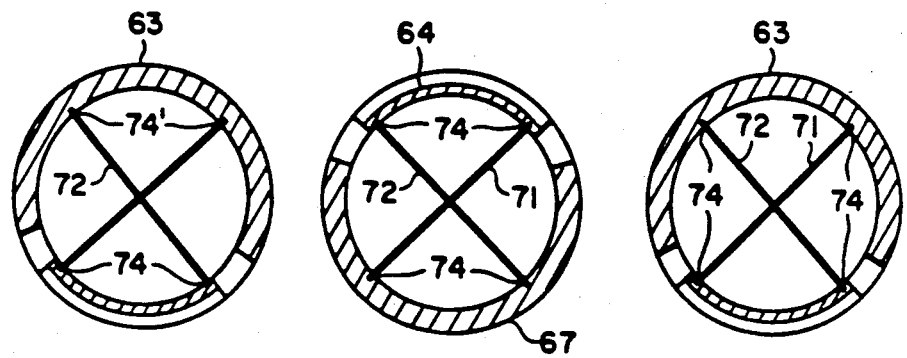

STRUCTURAL CORE PIVOT

BACKGROUND OF THE INVENTION

1. Field of the Invention

This invention relates to structural core pivot and more specifically to of a simplified construction of a core pivot which eliminates a surrounding support sleeve.

2. Description of the Prior Art

Flexural pivot devices and methods of manufacturing flexural pivot devices are well known in the prior art as exemplified by the following U.S. Pat. Nos.: 3,073,584; 3,181,851; 3,181,918; 3,188,071; 3,252,696; 3,319,951; 3,807,029; 3,811,665; 3,825,992; 3,844,022; and 4,327,527.

Several of these patents deal with simplifying the construction and method of manufacture of flexural core pivots. However, prior art flexural core pivot devices generally require a surrounding cylinder or sleeve which supports the basic resilient flexural core construction.

SUMMARY OF THE INVENTION

The disclosed flexural core pivot does not require the cylindrical supporting sleeves relied on in prior art of flexural pivots. The disclosed flexural pivot is constructed by making the separating slot in the core section in steps so they come close to the flexure springs on opposite ends of the pivot and are connected in the middle by a circumferentially extending slot, to form when brazed, a large diameter segment on each end that is over 180°. Making a large diameter arcuate section on each end which is over 180° allows the ends to be gripped by a clamp or similar device. To form a core for a double ended pivot, the slot is made in a double step forming a greater than 180° larger diameter segment on each end and also in the middle.

For a cantilever flexure pivot according to the present invention a cylindrical or tubular part is machined to provide two similar shaped members which are relatively interconnected by flat formed springs. Both member includes a larger diameter arcuate portion formed at one end which is greater than 180° and a smaller diameter arcuate portion at the other end which is less than 180°. The similar shaped members are disposed so that the smaller diameter, less than 180° arcuate segment, is positioned in the open arcuate area defined by the circumferentially spaced sides of the larger diameter, greater than 180° arcuate segments. The angular separation or spacing between the larger diameter portions and the smaller diameter portions limits the maximum degree of movement through which the flexure pivot can be angularly deflected.

In a double ended flexure pivot the core is formed from a cylindrical member with larger diameter, greater than 180° arcuate segments formed at each end and in the middle. Slots which defines the large and small arcuate segments extend circumferentially around the core and connect separations between the larger diameter segments and the smaller diameter segments.

The construction of the disclosed pivot is simplified with very little loss of performance making it suitable for use in light, high volume, applications. The mounting openings formed in the parts which the flexural core pivot connects act as the outer sleeve.

BRIEF DESCRIPTION OF THE DRAWINGS

For a better understanding of the invention reference may be had to the preferred embodiments exemplary of the invention shown in the accompanying drawings in which:

FIG. 1 is a side view of cylindrical member, partially machined, from which a cantilever flexural pivot according to the present invention is constructed;

FIG. 2 is a section view of a cantilever flexural pivot according to the present invention, with the flat spring members not shown for clarity;

FIG. 3 is a section view, including the flat springs, of the flexural pivot of FIG. 2 along the lines III—III;

FIG. 4 is a view siimilar to FIG. 3 of the flexural pivot of FIG. 2 along the lines IV—IV;

FIG. 5 is a view similar to FIG. 3 of the flexural pivot of FIG. 2 along the lines V—V;

FIG. 7 is a side view of a partially machined cylindrical member used for constructing double ended flexural pivot according to the present invention;

FIG. 8 is a section view taken in FIG. 11 along the lines VIII—VIII;

FIG. 9 is a section view taken in FIG. 11 along the lines IX—IX;

FIG. 10 is a section view taken in FIG. 11 along the lines X—X; and

FIG. 11 is a section view of a flexural pivot according to the present invention with the springs not shown for clarity;

DETAILED DESCRIPTION OF THE PREFERRED EMBODIMENTS

Figure 6:
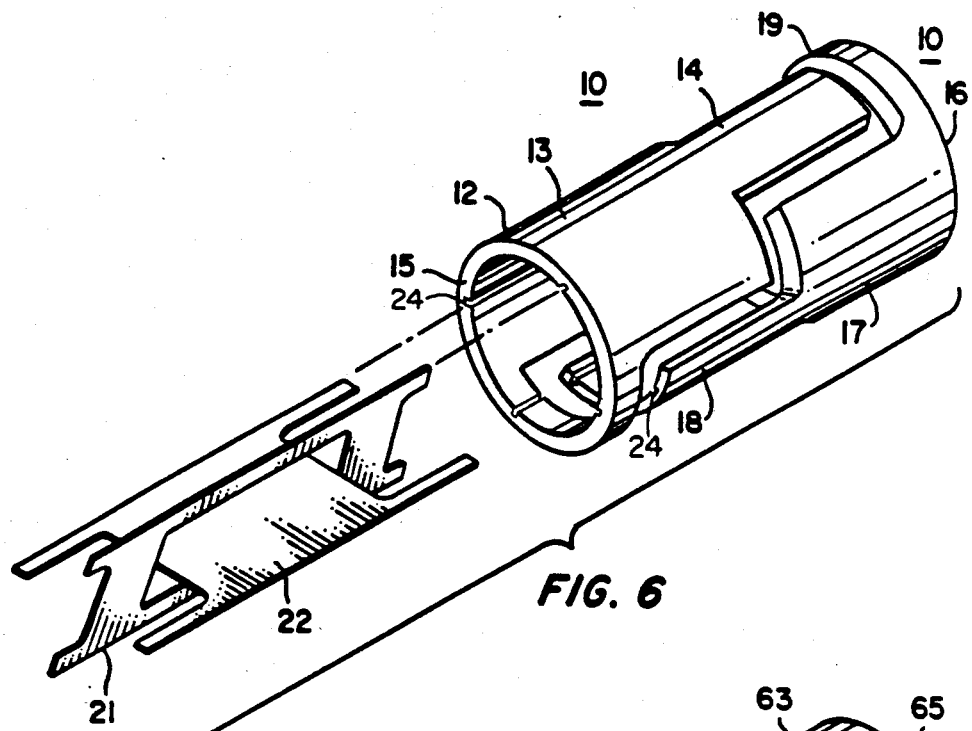
FIG. 6 is a view of a cantilever flexural pivot according to the present invention showing the flat spring members removed.
Figure 12:
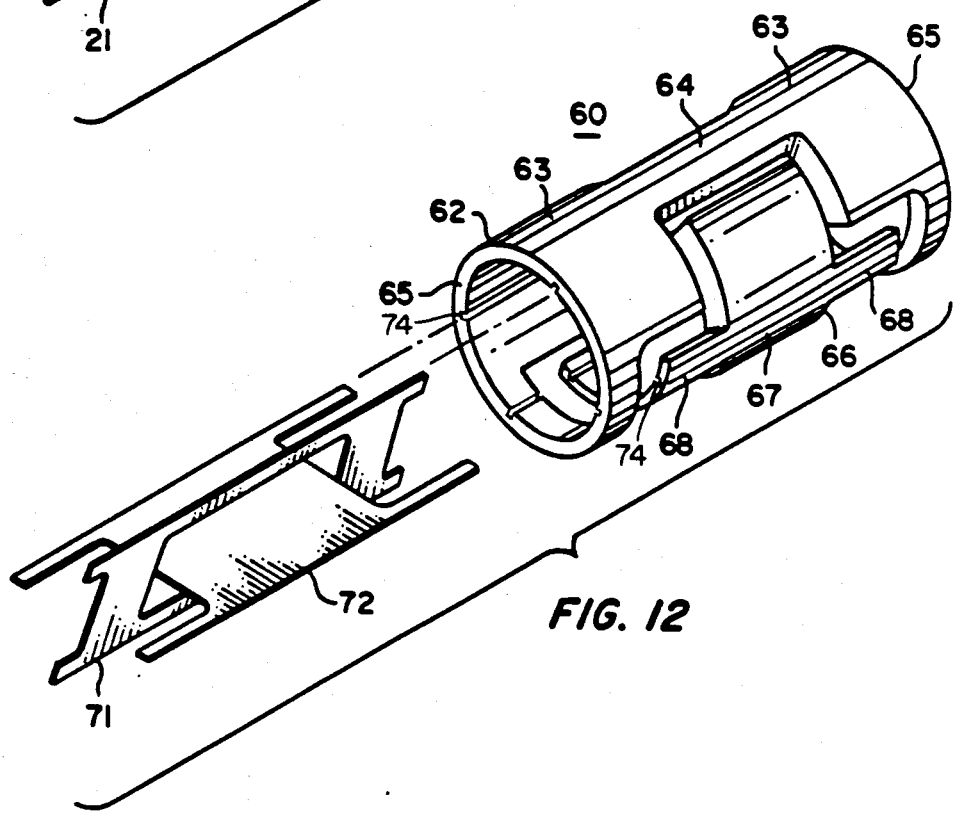
FIG. 12 is an isometric view of double ended flexural pivot according to the present invention showing the flat springs removed.

Referring now to the drawings and FIGS. 1–6 in particularly, there is shown a cantilever flexural pivot 10 constructed according to the teaching of the present invention. Flexural pivot 10 is formed from two similarly shaped members 12 and 16. Members 12 and 16 have a larger outer diameter portion 13, 17 and a smaller outer diameter portion 14, 18. The larger outer diameter portions extend more than 180° around pivot 10, while the smaller diameter portions 14, 18 extend less than 180° but more than 90° around pivot 10. An annular portion 15 or 19 which extends completely around an end of pivot 10, is formed as part of the larger diameter portion 12 or 16 respectively. The flexural pivot 10 can be formed without annular portions 15, 19 to shorten its length. If annular portions 15, 19 are not connecting the larger diameter portions 13, 17 will provide the connecting supports to pivot 10.

Two formed flat springs 21 and 22 are formed from resilient stock and are assembled as shown in FIG. 6. I shaped spring 22 is fit through the opening in spring 21. Springs 21 and 22 are aligned perpendicularly as shown in FIGS. 4 and 5. Opposing slots 24 are formed in members 12 and 16 to receive springs 21 and 22 which provide relative support between members 12 and 16. Although only one type of flexural spring arrangement is shown it should be noted that many alternate spring designs can also be used without departing from the invention.

The separation between the large diameter portions 13, 17 and the small diameter portions 14, 18 determines the maximum angular displacement through which pivot 10 can be flexed. When assembled, the ends of spring members 21, 22 do not extend beyond the free ends of small diameter portions 14, 18. Assembly of the flexural springs 21, 22 in the core members 12, 16 can be accomplished with automated equipment. The assembly of members 12 and 16 and flexural springs 21 and 22 are brazed together, preferably by heating in a controlled nonoxidizing atmosphere at a temperature suitable for providing both brazing and proper heat treatment for best flexural properties. Other means of attaching the flexural springs 21, 22 to the sleeve members 12, 16 such as bonding or welding may also be used.

Members 12 and 16 are formed from single cylindrical member 11, which is shown in FIG. 1. Cylindrical member 11 has the small diameter portions 14, 18 formed thereon by suitable metal removal techniques. Longitudinally extending openings or slots 30 and 32 which are a circumferentially offset are formed on opposite ends of cylindrical member 11. Circumferentially extending openings or slots 34 connect slots 30, 32. Additional circumferentially extending slots 36, 38, as shown in FIG. 2, are formed around the small diameter portions 14, 18 of cylindrical member 11 to form parts 12, 16. Circumferentially extending openings or slots 36, 38 are formed in member 11 after its outer ends are cut to the desired length and after springs 21, 22 are brazed in place. The large diameter end portions 13, 17 extend more than 180° around the circumference of pivot 10 and can be engaged by a suitable clamp or secured in mounting holes formed in the parts to be supported by the pivot. Note that the disclosed pivot has a very simple construction and only two core pivot members, 12, 16 and two shaped flat springs, 21, 22 are required.

Referring now to FIGS. 7-12 there is shown a two ended flexural core pivot 60 constructed according to the teaching of the present invention. In the double ended flexure pivot the center portion 66 can be angularly rotated with respect to the two integral end portions of member 62. The end portions are connected by a reduced outer diameter portion 64. Portion 64 extends between the two larger outer diameter portions 63 formed at opposite ends of member 62. Member 62 has annular portions 65 extending completely around its outer ends.

Large diameter portions 63 extend more than 180° circumferentially around flexural pivot 60. Member 66 is formed with smaller diameter portions 68 at its outer ends. Smaller diameter portions 68 are disposed between the circumferentially spaced apart sides of larger outer diameter portions 63. Member 66 includes a larger diameter portion 67 extending circumferentially around pivot 64 more than 180°. Since the larger outer diameter portions 63 and 67 extend more than 180° around pivot 60, they can be secured by a clamp or held in an appropriate mounting openings hole. The double ended flexural pivot 60 can be formed without annular portions 65 to shorten its length. If annular portions 65 are not provided the larger diameter portions 63, 67 will provide full support for connecting to pivot 60.

Flexural springs 71, 72 are disposed in slots 74 which are formed in members 62, 66. Springs 71, 72 do not extend longitudinally beyond the free ends of small diameter portions 68. Springs 71, 72 are bonded to members 62, 66 by any suitable means. The material, size, orientation, or construction of springs 71, 72 can be varied for particular applications. When assemblied friction free angular deflection between parts 62, 66 is provided. Rotation can be made in either direction as limited by the resistance of the flexural springs 71, 72 or the angular separations between large diameter portion 63 and small diameter portion 68.

The disclosed pivot construction eliminates the need for a supporting sleeve around the flexural pivot as required in prior art flexural pivots. Members 62, 66 are formed from a single cylindrical member 76 which is shown, partially machined, in FIG. 7. Member 76 has offset longitudinally extending slots 80, 82 formed therein which are connected by circumferentially extending slots 84. To form flexural pivot 60, the ends of cylindrical member 76 are cut to the desired length and additional circumferential slots 86 and 88, as shown in FIG. 11, are cut around the smaller diameter portions 68 which extend from larger diameter portion 67. Forming slots 86, 88 separates member 62 from member 66.

What is claimed:

1. A flexural pivot comprising:
   a first member having a circumferentially extending larger outer diameter arcuate portion extending more than 180° and a reduced outer diameter arcuate portion of less than 180° extending therefrom;
   a similarly shaped second member disposed on the same longitudinal axis as said first member with its reduced outer diameter portion extending between the circumferentially spaced apart ends of the larger diameter portion of said first member; and
   spring means for connecting said first member and said second member permitting relative rotational movement.

2. A flexural pivot as claimed in claim 1 comprising:
   an annular portion formed at the free end of each of the larger outer diameter portions and extending 360°.

3. A flexural pivot formed from two members of substantially the same shapes supported by spring members for limited angular displacement around a common longitudinal axis, each member comprises:
   a large diameter end having a circumferentially extending portion extending more than 180° but less than 360° and extending therefrom an integral smaller diameter end extending circumferentially less than 180° but more than 90°.

4. A flexural pivot as claimed in claim 3 comprising an annular portion formed at the free end of the large diameter portion of each member extending circumferentially through a greater arc than the associated large diameter portion.

5. A flexural pivot device having a portion secured to a first part and another portion thereof secured to a second part permitting a small angular deflection between the first part and the second part, said flexural pivot comprising:
   a first member having at one end a first larger diameter arcuate portion extending circumferentially more than 180° secured in the first part and at the other end a first smaller diameter arcuate portion extending less than 180° circumferentially and extending into the second part;
   a second member having a second larger diameter arcuate portion extending circumferentially more than 180° secured in the second part and having a second smaller diameter arcuate portion extending less than 180° circumferentially and extending into the first part; and, spring means extending between and supporting said first member with respect to said second member to permit relative angular motion thherebetween.

6. A flexural pivot as claimed in claim 5 wherein the first member has formed at its large diameter end an annular portion extending circumferentially more than its related large diameter portion; and said second member has formed at its large diameter end an annular portion extending circumferentially more than its related large diameter portion.

7. A flexural pivot comprising:

a first member having a circumferentially extending larger outer diameter arcuate portion extending more than 180° and a first reduced outer diameter arcuate portion of less than 180° extending therefrom;

a second member having a first circumferentially extending larger outer diameter arcuate portion extending more than 180° and a reduced outer diameter arcuate portion of less than 180° extending therefrom;

spring means for connecting said first member and said second member for relative movement with the first reduced outer diameter arcuate portion of said first member extending into the open circumferential area defined by the first circumferentially extending larger outer diameter arcuate portion of said second member.

8. A flexural pivot as claimed in claim 7 wherein:

said first member has a second reduced outer diameter arcuate portion of less than 180° extending therefrom opposite the first reduced outer diameter arcuate portion; and said second member has a second circumferentially extending larger outer diameter portion, extending more than 180°, extending from the reduced outer diameter arcuate portion opposite the first circumferentially extending larger outer diameter arcuate portion.

9. A flexural pivot as claimed in claim 8 wherein:

the first and second larger outer diameter portions of said second member each include an annular portion formed at its free end and extending circumferentially more than its associated larger outer diameter portion.

10. A flexural pivot comprising:

a first member having a larger diameter arcuate portion extending more than 180° and a reduced diameter arcuate portion extending less than 180°;

a second member having a larger diameter arcuate portion extending more than 180° and a reduced diameter arcuate portion extending less than 180°;

spring means for connecting said first member and said second member with the reduced diameter portion of said first member disposed in the open area defined by the larger diameter portion of said second member and the reduced diameter portion of said second member disposed in the open area defined by the larger diameter portion of said first member.

11. A flexural pivot as claimed in claim 10 wherein:

said first member includes a second larger diameter arcuate portion extending more than 180° which projects from the reduced diameter arcuate portion; and said second member includes a second reduced diameter arcuate portion which projects from the larger diameter arcuate portion.

12. A flexural pivot as claimed in claim 11 wherein:

the first and second larger diameter arcuate portion each include an annular portions.

* * * * *